US006861811B2

(12) United States Patent
Buij

(10) Patent No.: US 6,861,811 B2
(45) Date of Patent: Mar. 1, 2005

(54) HALF BRIDGE WITH CONSTANT AMPLITUDE DRIVE SIGNAL

(75) Inventor: Arnold Willem Buij, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/125,726

(22) Filed: Apr. 18, 2002

(65) Prior Publication Data

US 2002/0167281 A1 Nov. 14, 2002

(30) Foreign Application Priority Data

Apr. 20, 2001  (EP) .............................................. 01201433

(51) Int. Cl.[7] .............................................. H05B 37/00
(52) U.S. Cl. .................................. 315/224; 315/209 R
(58) Field of Search .............................. 363/15, 16, 20, 363/21, 95, 98; 330/251, 207 A; 315/291, 224, 209 R, 219, 308, 225, 307, DIG. 7

(56) References Cited

U.S. PATENT DOCUMENTS

| 4,503,362 A | * | 3/1985 | Hanlet ......................... 315/224 |
| 4,881,014 A | * | 11/1989 | Okochi .................. 315/DIG. 7 |
| 5,023,566 A | * | 6/1991 | El-Hamamsy et al. ....... 330/251 |
| 5,200,672 A | | 4/1993 | Sheynberg et al. .......... 315/248 |
| 5,710,489 A | * | 1/1998 | Nilssen ................... 315/209 R |
| 5,768,111 A | * | 6/1998 | Zaitsu .......................... 363/15 |
| 5,818,709 A | * | 10/1998 | Takehara ....................... 363/95 |
| 6,262,542 B1 | * | 7/2001 | Kim et al. ................... 315/224 |
| 6,316,882 B1 | * | 11/2001 | Choi et al. .................. 315/225 |
| 6,392,488 B1 | * | 5/2002 | Dupuis et al. .............. 330/277 |

FOREIGN PATENT DOCUMENTS

WO   WO 00/21341   4/2000

OTHER PUBLICATIONS

*Encyclopedia of Electronic Circuits*, Graf, Rudolf F., vol. 3, TAB Books, © 1991, p. 472.
Data Sheet for HEF4046B Phase Locked Loop, Philips Semiconductors, Jan. 1995.

* cited by examiner

*Primary Examiner*—Wilson Lee

(57) ABSTRACT

The invention concerns a circuit arrangement for igniting and operating an electrodeless gas discharge lamp by means of a high operating frequency drive voltage, comprising a half-bridge commutator having two switching elements each having an emitter electrode and a control electrode. The said switching elements are alternately switched to a conducting state by means of a resonant control circuit, which is coupled to an oscillator via a transformer. The said resonant control circuit comprises capacitor means forming part of said oscillator and a driver stage driven by an oscillator, the driver being of the class-E type. A DC supply voltage is supplied to the driver via a current-limiting circuit. The amplitude of the high frequency drive voltage is substantially constant in a chosen frequency range.

6 Claims, 1 Drawing Sheet

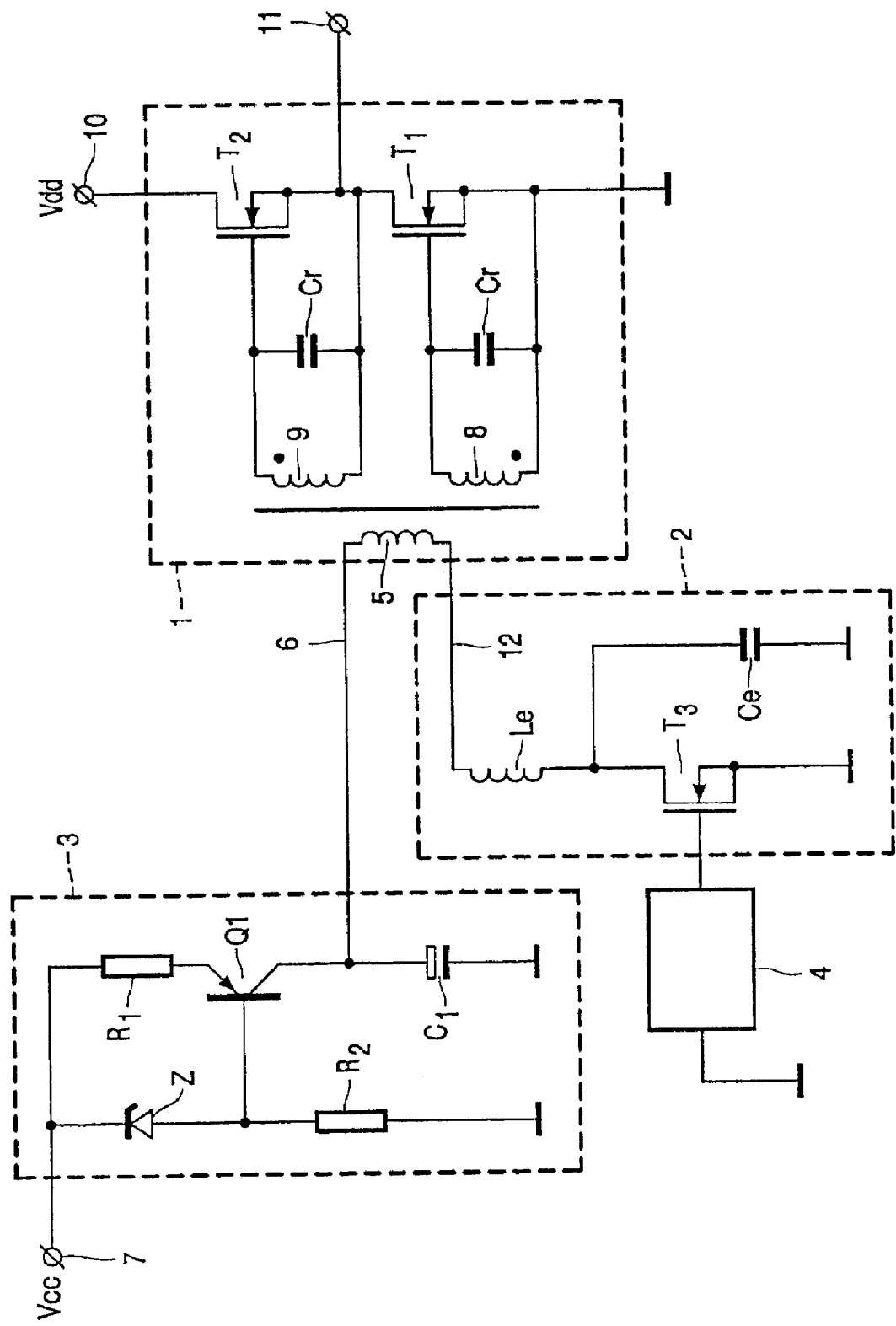

HALF BRIDGE WITH CONSTANT AMPLITUDE DRIVE SIGNAL

BACKGROUND

The invention relates to a circuit arrangement for igniting and operating a discharge lamp by means of a high operating frequency drive voltage, said circuit comprising a half-bridge commutator having two switching elements each having an emitter electrode and a control electrode, said switching elements being alternately switched to a conducting state by means of a resonant control circuit which is coupled to an externally driven oscillator via a transformer, said resonant control circuit comprising capacitor means forming part of said oscillator.

Such a circuit is known from international patent application WO-A-00/21341. The known circuit is used to ignite and operate an electrodeless gas discharge lamp. In the known circuit the half bridge commutator and the resonant control circuit form together a power stage supplying power to the load. In this prior art circuit arrangement, the amplitude of the drive voltage applied to the power stage supplying power to the load, in the prior art the electrodeless gas discharge lamp, is frequency-dependent due to the fact that the power stage comprises a resonant transformer. From a technical point of view, the transformer can not be omitted from the circuit arrangement because of the high operating frequency, for electrodeless gas discharge lamps generally 2.5–2.8 MHz. The amplitude variations give rise to loss of zero voltage switching in the power stage and high driver losses when the amplitude is too high and to increased conduction losses in the power stage when the amplitude is too low. This forms a technical problem.

It is an object of the invention to design a circuit arrangement of the type specified in the above-mentioned preamble, in such a way that this technical problem is solved. Furthermore, it is an object of the invention to make sure that the operating frequency of the converter is kept exactly equal to the resonant frequency of the load circuit. It should be appreciated in this respect that the resonant frequency may vary appreciably due to component tolerances and temperature effects. In the circuit arrangement, the voltage-controlled oscillator forms part of a frequency loop in which the phase difference between the half-bridge voltage and the circuit voltage is kept at a value of exactly 900. Thus, the VCO must be kept in line therewith. This is the reason why the gate driver, in a specified frequency range, should supply a voltage having a sufficiently constant amplitude.

Furthermore, it may be desirable, especially in the igniting phase of the discharge lamp, to use a frequency differing from the frequency used for normal use. Also under such circumstances the gate driver must operate properly.

SUMMARY

In view of the above, in the circuit arrangement according to the present invention, a driver driven by the oscillator forms a coupling from the resonant control circuit to the oscillator, which driver is of the class B type, and a DC supply voltage is supplied to the driver via a current-limiting circuit, the circuit arrangement being such that the amplitude of the high-frequency drive voltage is substantially constant in a chosen frequency range. The inventive circuit has the additional advantage that it is also suitable to be part of a circuit arrangement for igniting and operating a high intensity discharge lamp, like for instance a metal halide lamp.

In a practical embodiment of the circuit arrangement according to the invention, the operating frequency is above 1 MHz.

Particularly for igniting and operating an electrodeless gas discharge lamp, the circuit arrangement of the invention may exhibit the feature that the operating frequency is about (2.65±0.15) MHz, said chosen frequency range being about 0.30 MHz.

BRIEF DESCRIPTION OF THE DRAWING

An embodiment of the invention will be further explained with reference to a drawing. The drawing comprises only one FIGURE of a practical embodiment of a circuit arrangement for igniting and operating an electrodeless gas discharge lamp. In the following description reference is made to this FIGURE.

DETAILED DESCRIPTION OF THE INVENTION

The circuit arrangement according to the FIGURE comprises a power stage 1, a class B driver 2, a current limiter 3 and a voltage control oscillator (VCO) 4, forming the externally driven oscillator.

The power stage 1 comprises two FETs T1, T2, 3NA50, two capacitors Cr of 4.7 nf and a transformer Tr comprising a primary winding 5 and two secondary windings 8,9 with winding ratios 1:1:1. The supply voltage Vdd at terminal 10 has a value of about 400 V.

The lower terminal 12 of primary windings 5 of transformer Tr is connected to class B driver 2, which in turn comprises a FET BSB122, an inductor Le of 1.5 $\mu$hy and a capacitor CE of 470 pf. The driver 2 is controlled by a control voltage supplied by VCO 4 of the type HEF4046. The frequency of the output voltage provided by this VCO 4 is about 2.5–2.8 MHz.

The upper terminal 6 of primary winding 5 of transformer Tr is connected to current limiter 3 comprising a transistor Q1 of the type BD136, resistor R1 with a value of 15 $\Omega$, R2 having a value of 5 k$\Omega$, a Zener diode Z having a Zener voltage of 2 V, and an electrolytic capacitor C1 of 1 $\mu$f. The supply voltage Vcc has a value of 15 V.

The driver voltage amplitude generated at the gates of the power stage Fets T1, T2 is roughly proportional to the DC current drawn by the class-E driver stage 2. By inserting the current limiter 3 between the upper terminal 6 of the primary winding 5 of Tr and the Vcc terminal 7, the amplitude of the driver voltage is made substantially constant in a frequency range as wide as 300 kHz with a center frequency of 2.65 MHz, whereas without the current limiter, the drive voltage amplitude may vary up to a factor of 2 in the same frequency range.

A load to which power is to be supplied is connected to load terminal 11.

A further important advantage of the presence of the current limiter is the reduction of power loss in the driver stage 2 itself.

Adding the current limiter to the prior art circuit arrangement in according with the teachings of the present invention, brings significant advantages while causing only small extra costs.

It should be noted that the current limiter 3 shown in the accompanying FIGURE is only a practical example. Also other circuit arrangements may be used, e.g. a current source on the basis of an integrated circuit.

FETs T1 and T2 each have a parasitic capacitance effectively parallel connected to respective capacitors Cr. These capacitances have non-negligible values, e.g. in the order of several hundred pf to several nf, dependent upon the power rating of power stage 1.

What is claimed as the invention is:

1. A circuit arrangement for igniting and operating a discharge lamp by means of a high operating frequency drive voltage, said circuit comprising
   a half-bridge commutator having two switching elements each having an emitter electrode and a control electrode, said switching elements being alternately switched to a conducting state by means of a resonant control circuit which is coupled to an externally driven oscillator via a transformer,
   said resonant control circuit comprising
   capacitor means forming part of said oscillator, wherein a driver driven by the oscillator forms a coupling from the resonant control circuit to the osicllator, which driver is of the class-E type, and
   a current-limiting circuit supplying a substantialy constant current to said driver such that the amplitude of the high frequency drive voltage is substantially constant in a chosen frequency range.

2. The circuit arrangement as claimed in claim 1, wherein the operating frequency is over 1 MHz.

3. The circuit arrangement as claimed in claim 2, which arrangement is suitable for igniting and operating an electrodeless gas discharge lamp, and in which the operating frequency is about (2.65±0.15) MHz, said chosen frequency range being about 0.30 MHz.

4. In a circuit for driving a gas discharge lamp, said circuit including a half-bridge commutator having an output, a driver coupled to said half bridge commutator by a transformer, and an oscillator providing a high frequency signal to the driver, the improvement comprising:
   a current-limiting circuit providing a substantially constant current to said driver whereby said transformer provides a substantially constant amplitude drive signal to said commutator.

5. The circuit as set forth in claim 4 wherein said current limiting circuit includes active components.

6. The circuit as set forth in claim 4 wherein said driver provides a substantially constant amplitude signal over the range of frequencies from approximately 2.5 MHz to approximately 2.8 MHz.

* * * * *